United States Patent [19]
Rudolph

[11] 3,739,801
[45] June 19, 1973

[54] LOW ACTUATING PRESSURE TYPE VALVE STRUCTURE

[76] Inventor: Hans Rudolph, 7200 Wyandotte Road, Kansas City, Mo. 64114

[22] Filed: Dec. 6, 1971

[21] Appl. No.: 204,947

[52] U.S. Cl. .............................. 137/102, 251/61.1
[51] Int. Cl. ............................................ G05d 7/00
[58] Field of Search ............... 128/142.2; 137/63 R, 137/102, 512.2, 512.3; 251/61.1

[56] References Cited
UNITED STATES PATENTS

| | | | |
|---|---|---|---|
| 2,966,917 | 1/1961 | Bloom | 137/102 X |
| 3,608,574 | 9/1971 | Beaussant | 137/102 |
| 3,083,707 | 4/1963 | Seeler | 137/63 R |
| 2,615,463 | 10/1952 | Burns | 137/102 X |
| 2,871,854 | 2/1959 | Lambertsen | 128/142.2 |
| 2,922,430 | 1/1960 | Rosenbaum | 137/102 |
| 3,088,477 | 5/1963 | Bloom | 137/512.2 |
| 3,228,409 | 1/1966 | Godel | 137/512.3 X |
| 3,419,029 | 12/1968 | Straub | 137/102 X |
| 3,435,839 | 4/1969 | Elder | 137/102 |

FOREIGN PATENTS OR APPLICATIONS

| | | | |
|---|---|---|---|
| 1,190,467 | 3/1959 | France | 137/63 R |

Primary Examiner—Martin P. Schwadron
Attorney—Claude A. Fishburn and Malcom A. Litman

[57] ABSTRACT

A housing with flow passages and valve members actuated by low pressure is particularly adapted for respirating apparatus or other breathing apparatus. The housing has a body structure having connected portions with aligned passages, one portion having an end with the passage communicating with an inlet fitting mounted on the respective body member and the other end reduced to define a guide concentric with the passage therein. The other body portion has a valve seat adjacent to and spaced from said other end of the first body portion and a surrounding portion connected to same with a flexible seal therebetween. The seal has a resilient extendable portion and an end forming a valve element normally engaging the valve seat. The second named body portion has an outlet passage through which fluid is discharged when differential pressure on the valve element unseats same. The valve element has openings in the central portion and a flapper valve member is mounted thereon to normally close same and adapted to open in response to differential pressure thereon for flow of fluid from the inlet to the passage in the second named body portion.

4 Claims, 6 Drawing Figures

Patented June 19, 1973

3,739,801

INVENTOR.
Hans Rudolph
BY
Fishburn, Gold & Litman
ATTORNEYS

LOW ACTUATING PRESSURE TYPE VALVE STRUCTURE

The present invention relates to valve devices and more particularly to a valve structure adapted for use in breathing apparatus wherein sensitivity of operation enables the valve to open and close effectively in response to relatively light fluid pressure.

The principal objects of the present invention are: to provide a valve device which is capable of quickly assuming full flow position under relatively light pressure, and closing substantially instantaneously as flow ceases; to provide a valve device in which all parts are of non-corrosive material such as suitable synthetic resins; to provide such a device with a resilient seal and valve element carried thereby that moves in response to differential fluid pressure for directing fluid flow; to provide a valve structure for directing flow of low pressure fluids, such as for breathing apparatus, wherein a flexible bellows moves a valve element to a position for directing the fluid through the valve structure in response to the direction of flow of the fluid; to provide such a valve structure wherein the valve element opens in response to inlet flow of fluid and closes in response to reverse flow of fluid and the reverse flow is directed out of the valve structure through an exhaust passage; to provide such a valve structure permitting full flow of fluid therethrough in response to pressure differential while minimizing pressure drop through the valve structure; to provide such a valve structure having a minimum of moving parts and wherein the moving parts are resilient members to thereby provide long life and eliminate wear on other elements of the valve structure; and to provide such a valve structure which has great dependability of performance, is of simple and durable construction, is economical to manufacture, is positive in operation, and is particularly adapted for use with breathing apparatus.

Other objects and advantages will become apparent from the following description taken in connection with the accompanying drawings wherein are set forth by way of illustration and example certain embodiments of this invention:

Figure 1:
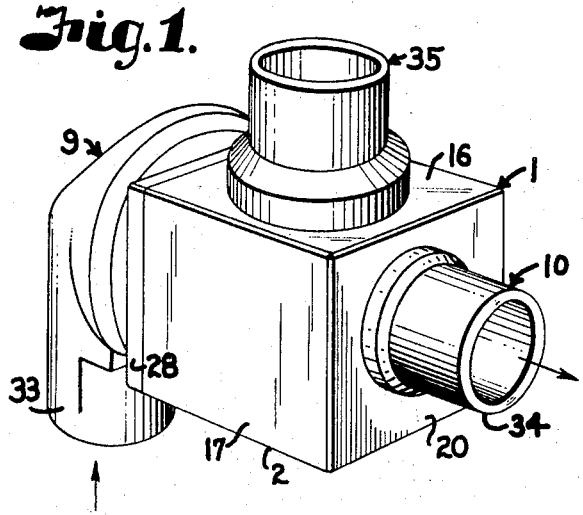
FIG. 1 is a perspective view of a valve structure embodying features of the present invention.
Figure 2:
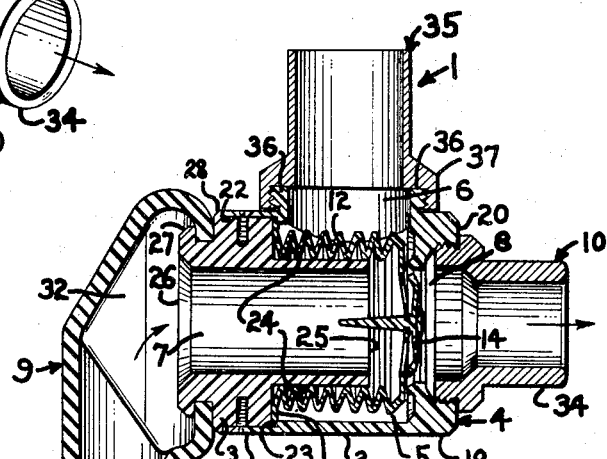
FIG. 2 is a longitudinal secitonal view through the valve structure showing flexible elements positioned for fluid flow in one direction through the valve structure.
Figure 3:
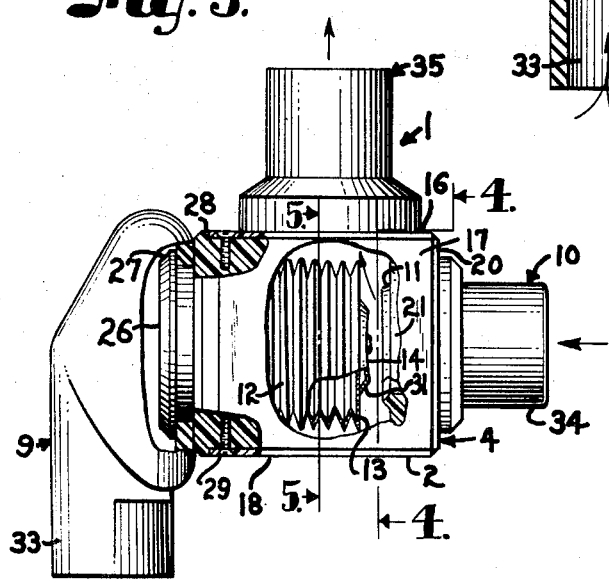
FIG. 3 is a side elevational view of the valve structure with portions broken away to better illustrate the component parts and showing the flexible elements positioned for fluid flow outwardly through an exhaust passage.
Figure 4:
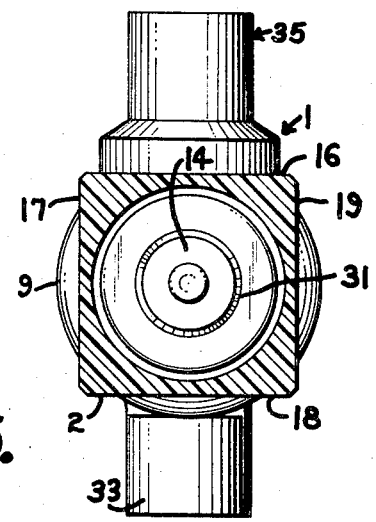
FIG. 4 is a transverse sectional view through the valve structure taken on line 4—4, FIG. 3 showing a flapper valve in seated position.

Referring more in detail to the drawings:

The reference numeral 1 designates a valve device having a composite housing or body 2 of joined body members 3 and 4. The body has a valve chamber 5 therein with an exhaust or outlet passage 6 and aligned passages 7 and 8 in the body members 3 and 4 respectively. The valve device 1 is adapted for actuation by low pressure and is particularly adapted for use in breathing apparatus with an inlet fitting 9 for connection to a source of gaseous fluid, such as air, oxygen, anesthetic gases and the like (not shown). Also the device has a flow fitting 10 adapted to be suitably connected to a mask or hose (not shown). In the body 2 there is a valve seat 11 and an extensible member 12 with an end 13 to sealingly engage same to form a continuous flow passage and an inlet valve element 14 is carried by the extensible member 12 whereby the valve element 14 is normally closed and opened in response to differential pressure acting thereon. In the illustrated structure, the extensible member 12 also forms a seal between the body members 3 and 4 and between the extensible member 12 and the body member 3 so movement of the extensible member 12 to unseat the end 13 thereof from the valve seat 11 opens the structure for flow from the passage 8 of the body member 4 to the valve chamber 5 and then to the outlet passage 6. The free end 13 of the extensible member 12 has a plurality of ports 15 therein for flow of fluid from the inlet passage 7 to the passage 8 and out the flow fitting 10. The valve element 14 opens the ports 15 in response to pressure in the passage 7 and the valve element 14 and the ports 15 covered thereby are spaced inwardly from the valve seat 11.

The valve device 1 is particularly adapted for directing flow of low pressure fluids, such as for breathing apparatus (not shown) wherein fluid flowing into the elongate resilient extensible member 12 is operative to extend the extensible member 12 and seat the free end 13 thereof on the valve seat 11 and to open the valve element 14 to permit the fluid to flow through the valve device 1. Suction on the flow fitting 10 is also operative to extend the extensible member 12 and seat the free end 13 thereof on the valve seat 11. Fluid flowing into the valve device 1 through the flow fitting 10 is operative to move the free end 13 of the extensible member 12 away from the valve seat 11 to permit the fluid to enter the valve chamber 5 within the valve device 1 and to flow outwardly through the exhaust passage 6.

In the illustrated structure, the body member 4 is an elongate tubular member which is generally rectangular in cross sections and has side walls 16, 17, 18 and 19 and an end wall 20 for closing one end thereof. The valve seat 11 is an annular portion at the free end of a tubular flow member 21 which extends into the valve chamber 5 from the end wall 20 and the tubular flow member 21 is axially aligned with the flow passage 8 through the end wall 20. The side walls 16, 17, 18, and 19 define the valve chamber or bore 5 through the body member 4 and the end wall 20 closes one end of the bore or chamber 5. The other end of the body member 4 has a counterbore 22 forming a shoulder 23 to be engaged by the resilient expansible member 12 to thereby fix one end thereof, as later described.

The body member 3 is illustrated as a closure member mounted at the other end of the body member 4 for closing same and the closure member 3 is shaped to seat within the counterbore 22 and to engage and hold the end of the extensible member 12 in clamping engagement with the shoulder 23. A tubular guide member 24 extends into the chamber or bore 5 of the body member 4 and is axially aligned with the tubular flow member 21 and has a free end 25 longitudinally spaced from the valve seat 11 on the free end of the flow member 21. The tubular guide member 24 has a bore axially aligned with and forming a portion of the inlet flow passage 7 for communicating with the inlet fitting 9.

A tubular mounting structure 26 extends outwardly from the closure member 3 and is positioned in alignment with the tubular guide member 24. The tubular mounting structure 26 has an inlet flow passage or bore extending therethrough and axially aligned with and forming a portion of the inlet passage 7 for flow of a fluid under pressure into the valve chamber 5. In the illustrated structure, the mounting structure 26 is generally a cylindrical member having an annular flange 27 on the free end thereof for receiving the inlet fitting 9 thereon, as later described.

The closure member 3 is a planar member having peripheral edges shaped to seat within the counterbore 22 and engage and hold one end of the extensible member 12, as later described, in clamping engagement with the shoulder 23. The closure member 3 has a flange 28 extending outwardly from the peripheral edges thereof which is positioned to engage the other end of the body member 4 to close same while the closure member 3 holds the end of the extensible member 12 in clamping engagement with the shoulder 23. Suitable fastening devices, such as screws 29, secure the flange 28 to the body member 4.

The elongate resilient extensible member 12 is illustrated as a flexible tubular bellows sleeved on the tubular guide member 24 and having a flange 30 at one end thereof. The flange 30 is generally rectangular in shape to have the peripheral edges thereof held in clamping engagement between the closure member 3 and the shoulder 23 of the body member 4. The bellows 12 is illustrated as an elongate tubular member having a plurality of accordian folds intermediate the ends thereof and the free end 13 is a planar member having a plurality of the passages or ports 15 therethrough for flow of fluid from the inlet flow passage 7 into the flow passage 8 when the bellows 12 is extended to have the free end 13 thereof engaging and seated on the valve seat 11 at the free end of the flow member 21.

The valve element 14 is illustrated as a resilient flapper valve member mounted on the free end 13 of the bellows 12 for opening and closing the passages or ports 15 therethrough. The resilient valve member 14 is illustrated as an annular planar member or disc having the center thereof secured to the free end 13 of the extensible bellows 12 and the peripheral edge 31 thereof free to move to open and close the passages or ports 15 through the free end 13 of the extensible bellows 12.

The peripheral edge 31 of the valve element 14 is thickened to form a skirt having a rim extending into sealing engagement with the free end 13 of the extensible bellows 12 outwardly of the ports 15 therethrough. The center of the disc 14 is spaced from the free end 13 of the bellows 12 and peripheral edge 31 of the disc 14 is inclined toward said free end 13.

The ports 15 are spaced inwardly from the valve seat 11 at the free end of the tubular flow member 21 a sufficient distance such that the rim of the skirt or thickened peripheral edge portion 31 will be within the tubular flow member 21 and have clearance to flex to lift the skirt away from the free end 13 for opening the ports 15 in response to pressure against the valve element 14 beneath the skirt or edge 31 for flow of fluid into the flow passage 8.

In the illustrated structure, the inlet fitting 9 is rotatably mounted on the mounting structure 26 for receiving fluid under pressure and conveying same into the valve structure 1. The inlet fitting 9 has an inlet flow passage 32 therethrough which has an end portion 33 extending transversely to the inlet flow passage 7 of the closure member 3. It is preferable that the inlet fitting 9 be formed of resilient material and have an aperture in one end thereof with the surface defining the aperture sized to sealingly engage an exterior surface of the mounting structure 26. The inlet fitting 9 is moved onto the mounting structure 26 to move the aperture over the flange 27 and seat on the exterior surface of the mounting structure 26.

The flow fitting 10 is illustrated as an elongate tubular flow nipple 34 which is mounted on the end wall 20 to communicate with the flow passage 8 therethrough and the flow nipple 34 extends outwardly from the end wall 20 for conveying fluid into and out of the flow member 21. In the illustrated structure, one end of the flow nipple 34 is threaded to be received within complementary threads within the flow passage 8.

An exhaust nipple 35 is mounted on the side wall having the exhaust passage or opening 6 therethrough for exhausting fluid from the valve chamber 5 and the exhaust nipple 35 extends outwardly from the body member 4. In the illustrated structure, an externally threaded tubular member 36 extends outwardly from the body member 4 and receives an internally threaded flange portion 37 of the exhaust nipple 35.

Fluid under pressure flows into the inlet fitting 9 through a suitable tubular member (not shown), through the inlet flow passage 7 of the closure member 3 and through the guide structure 24 to move the free end 13 of the bellows 12 into seating engagement with the valve seat 11 at the free end of the tubular flow member 21. The pressure of the fluid within the guide structure 24 raises the thickened peripheral edge 31 of the valve element 14 to permit the fluid to flow through the passages or ports 15 into the flow member 21 and outwardly through the flow nipple 34. Fluid is caused to flow through the inlet fitting 9 and outwardly through the flow nipple 34 in response to fluid under pressure within the inlet fitting 9 and within the tubular guide structure 24 or in response to suction at the flow nipple 34 or through a suitable conduit (not shown) connected thereto. Fluid flowing into the tubular flow member 21 from the flow nipple 34 seats the thickened peripheral edge 31 of the valve element 14 to close the passages or ports 15 through the free end 13 and moves the free end 13 of the bellows 12 out of seating engagement with the valve seat 11 at the free end of the flow member 21 to permit the fluid to enter the chamber or bore 5 of the body member 4 and to flow outwardly through the exhaust passage 6 and exhaust nipple 35.

Figures 5, 6:
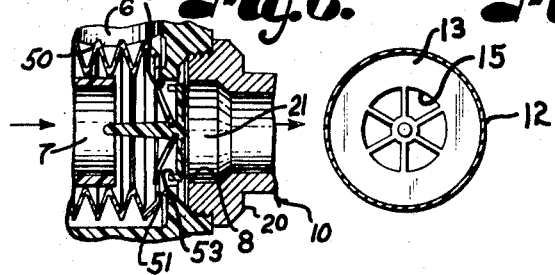
FIG. 5 is a fragmentary sectional view through bellows taken on line 5—5, FIG. 3 showing ports in the free end thereof.
FIG. 6 is a fragmentary longitudinal sectional view showing a modified extensible member and valve element.

FIG. 6 illustrates a modified extensible member 50 and a modified valve element 51 mounted on a free end 52 of the extensible member 50 and positioned at the center thereof. The valve element 51 is an annular planar member or disc having the center thereof secured to the free end 52 of the extensible member 50 and the peripheral edge 53 thereof depending from the planar portion and being thickened to form a skirt having a rim sealingly engageable with the free end 52 outwardly of a plurality of ports or passages therethrough.

The center of the valve element is spaced from the free end 52 of the extensible member 50 and the peripheral edge 53 is inclined toward said free end 52.

The ports or passages are spaced inwardly from the valve seat 11 at the free end of the tubular flow member 21 a sufficient distance such that the rim of the skirt or thickened peripheral edge 53 will be within the tubular flow member 21. The ports or passages are defined by a plurality of circumferentially spaced spokes extending radially between a center portion and a peripheral edge portion of the free end 52 of the extensible member 50. The spokes are sufficiently flexible to permit the valve element 51 to be moved out of sealing engagement with the free end 52 of the extensible member 50 and into the tubular flow member 21 after the free end 52 engages the valve seat 11.

It is to be understood that while I have illustrated and described certain forms of my invention, it is not to be limited to the specific forms or arrangement of parts herein described and shown.

What I claim and desire to secure by Letters Patent is:

1. A valve device comprising:
   a. a composite valve body having a valve chamber therein and an outlet opening, said valve body having a tubular guide extending into the valve chamber and an annular portion forming a valve seat, said tubular guide member and said seat being axially aligned and spaced apart within the valve chamber, said tubular guide member and said valve seat defining adjacent ends of fluid flow passages therein;
   b. a resilient extensible elongate tubular member sleeved on said tubular guide member and in sealing engagement with the valve body adjacent said guide member, said extensible member having a free end shaped to engage valve seat to close the fluid flow passage therein, said free end of said extensible member being flexible having ports therein spaced inwardly of the valve seat; and
   c. a valve element spaced inwardly from the valve seat and comprising a flexible member mounted on the free end of said extensible member and having a portion seating on same around the ports to close same, said valve element and said free end of said extensible member being adapted to flex in response to pressure in the passage in said tubular guide member to open the ports for flow therethrough.

2. The valve device as set forth in claim 1 wherein:
   a. said valve element is in the form of a disc with the center retained on the flexible free end of said extensible member;
   b. said disc is an annular member having a thickened peripheral edge portion forming a skirt with a rim thereof extending into sealing engagement with said free end of said extensible member; and
   c. said rim of said disc is positioned outwardly of the ports in the free end of said extensible member whereby pressure against the side of the valve element beneath the skirt flexes said valve element to lift the skirt to open the ports for flow of fluid therethrough.

3. The valve device as set forth in claim 1 wherein:
   a. said extensible member has a plurality of accordian folds intermediate the ends thereof;
   b. said flexible free end of said extensible member is a planar member having said ports circumferentially spaced therein; and
   c. said valve element is in the form of an annular disc having the center thereof secured at the center of said free end of said extensible member and the peripheral edge thereof free to move to open and close said ports.

4. A valve structure for directing flow of low pressure fluids comprising:
   a. an elongate tubular body member having side walls and an end wall for closing one end thereof, said end wall having a flow passage therethrough;
   b. a closure member mounted at the other end of said tubular body member for closing same and forming a chamber therein, said closure member having an inlet flow passage therethrough;
   c. a tubular flow member extending into said chamber within said body member from said end wall, said tubular flow member being axially aligned with said flow passage through said end wall;
   d. a tubular guide member extending into said chamber within said body member from said closure member in axial alignment with said inlet flow passage therethrough; said guide member being aligned with said tubular flow member and having a free end spaced from a free end of said tubular flow member;
   e. a resilient bellows sleeved on said guide member and having one end thereof held in a fixed position relative to said closure member, said bellows having a plurality of ports through the free end thereof with portions of said free end defining said ports being flexible, said free end of said bellows being movable between the free ends of said guide member and said flow member and shaped to seat thereon;
   f. flapper valve means mounted on said flexible free end portions of said bellows and movable therewith, said flapper valve means and said flexible free end portions normally closing said ports therethrough and opening same in response to fluid pressure in said tubular guide member;
   g. an exhaust passage through one of said side walls of said body member for flow of fluid from said chamber within said body member when the free end of said bellows is spaced from said free end of said tubular flow member;
   h. a tubular mounting structure extending from said closure member in axial alignment with said inlet flow passage therethrough, said mounting structure having an annular flange at the free end thereof;
   i. an inlet fitting rotatably mounted on said mounting structure flange for receiving and directing fluid into said tubular guide member, said inlet fitting having an inlet flow passage extending transversely to said mounting structure;
   j. means for mounting a flow nipple to communicate with said flow passage through said end wall, said flow nipple extending outwardly from said end wall; and
   k. means for mounting an exhaust nipple to communicate with said exhaust passage through said body member side wall, said exhaust nipple extending outwardly from said body member side wall.

* * * * *